(12) United States Patent
Greaney

(10) Patent No.: US 6,299,794 B1
(45) Date of Patent: Oct. 9, 2001

(54) ANHYDROUS PHOSPHATE-FREE ANTI-CORROSIVE ANTIFREEZE FORMULATION

(75) Inventor: James P. Greaney, Glenmoore, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 07/955,162

(22) Filed: Oct. 9, 1992

Related U.S. Application Data

(63) Continuation-in-part of application No. 07/662,100, filed on Feb. 28, 1991, now abandoned.

(51) Int. Cl.$^7$ ................................................. C09K 5/00
(52) U.S. Cl. ................................................ 252/74; 252/75
(58) Field of Search .......................................... 252/74, 75

(56) References Cited

U.S. PATENT DOCUMENTS

| | | | |
|---|---|---|---|
| 3,228,884 | * | 1/1966 | Daignault et al. ............. 252/74 |
| 4,242,214 | * | 12/1980 | Lambert, Jr. ................. 252/75 |
| 4,452,715 | * | 6/1984 | Hirozawa ..................... 252/75 |
| 4,455,248 | * | 6/1984 | Wood ......................... 252/75 |
| 4,647,392 | * | 3/1987 | Darden et al. ................ 252/75 |
| 4,717,495 | * | 1/1988 | Hercamp et al. .............. 252/75 |
| 4,725,405 | * | 2/1988 | Cassin et al. ................ 422/7 |
| 4,728,452 | * | 3/1988 | Hansen ....................... 252/75 |
| 4,851,145 | * | 7/1989 | Van Neste et al. ............ 252/75 |
| 4,961,878 | * | 10/1990 | Mullins ...................... 252/75 |

* cited by examiner

*Primary Examiner*—Necholous Ogden
(74) *Attorney, Agent, or Firm*—William C. Long

(57) ABSTRACT

The invention provides a phosphate-free anhydrous anhydrous anti-corrosive antifreeze formulation composed of propylene glycol and small but effective amounts of borate, molybdate, nitrate, nitrite, tolyltriazole and silicate, whichB formulation is used in the anhydrous form without water dilution and is particularly useful in engines which are adapted to operate at higher coolant temperatures for more effective performance.

1 Claim, No Drawings

ANHYDROUS PHOSPHATE-FREE ANTI-CORROSIVE ANTIFREEZE FORMULATION

RELATED APPLICATIONS

This application is a continuation-in-part of application Ser. No. 07/662,100 filed Feb. 28, 1991 now abandoned.

BACKGROUND OF THE INVENTION

1. Field of the Invention

The present invention relates to phosphate free corrosion-inhibited antifreeze formulations for use in the cooling systems of internal combustion engines. In particular, the invention relates to an anhydrous antifreeze formulation comprised predominantly of propylene glycol, together with borate, molybdate, nitrate, nitrite, tolyltriazole, and silicate.

2. Description of the Prior Art

The use of each of the components employed in the formulations of the present invention is taught in the art.

Propylene glycol is taught as a freezing point depressant in antifreeze formulations, for example in U.S. Pat. Nos. 2,147,409, 4,149,985 and many others.

Alkali metal borates have been used as corrosion-inhibitors in antifreeze formulations. See, for example, U.S. Pat. Nos. 4,149,985, 2,566,923, 3,960,740, 2,373,570, 2,815,328 and the like.

Alkali metal sebacates have been used as corrosion inhibitors in aqueous systems as taught in U.S. Pat. No. 2,726,215, and in antifreeze coolants as taught in U.K. Patent No. 1,004,259 and in U.S. Pat. Nos. 4,382,008, 4,561,990, 4,587,028, 4,588,513 and the like.

Alkali metal molybdates have been taught as corrosion-inhibitors in antifreeze formulations. See U.S. Pat. Nos. 2,147,409 and 4,561,990, for example.

Alkali metal mercaptobenzothiazole has been used in anti-freeze formulations along with other additives. See, for example, U.S. Pat. Nos. 2,815,328, 4,455,248, 4,414,126, 4,545,925 and the like.

Alkali metal nitrates have been added to antifreeze formulations as corrosion-inhibitors. See, for example, U.S. Pat. Nos. 2,815,328, 4,508,684, 4,455,248, 4,587,028 and the like.

Alkali metal nitrites have been added to antifreeze formulations as described, for example, in U.S. Pat. Nos. 4,587,028 and 4,728,452.

Tolyltriazole is taught as an antifreeze formulation component, for example in U.S. Pat. Nos. 4,242,214, 2,587,028, 4,382,008, U.K. Patent 1,004,259 and the like.

In addition, alkali metal silicates are shown as antifreeze components in, for example, U.S. Pat. Nos. 2,815,328, 4,242,214, 4,382,008, 4,382,870, 4,455,248, 4,149,985 and the like.

Alkali metal phosphates have been used as corrosion-inhibiting components of antifreeze formulations as shown, for example, in U.S. Pat. Nos. 2,147,409, 4,382,870, 4,455,248, 4,149,985, 4,545,925 and the like.

A considerable number of patents have been granted which are directed to antifreeze formulations which comprise certain specific combinations of components. Included among such patents are U.S. Pat. Nos. 4,242,214, 4,382,008, 4,382,870, 4,455,248, 4,561,990, 4,587,028, 4,588,513, 4,545,925, 4,000,079, 4,338,209, 4,759,864, 4,219,433 and many others.

A considerable amount of effort has been expended in the development of anhydrous antifreeze formulations and combustion engine cooling configurations which use the same. See U.S. Pat. Nos. 4,550,694 and 4,630,572 as well as "Development of an Anhydrous Coolant for Automotive Applications" by Greg P. Reny and Guy L. Titley of Dow Chemical Canada Inc.

In certain applications such as described, for example, in U.S. Pat. Nos. 4,550,694 and 4,630,572 cited above, the development of anhydrous antifreeze formulations which are used without water dilution is important. Operation using such formulations can be carried out at favorable higher coolant temperatures without the development of excessive pressures.

It should be noted that anhydrous formulations based on ethylene glycol are not suitable due to the freezing characteristics of anhydrous ethylene glycol formulations.

SUMMARY OF INVENTION

The present invention relates to a substantially anhydrous phosphate free anti-corrosive antifreeze coolant formulation which is used directly as an engine coolant without water dilution. Specifically, the present invention provides an antifreeze formulation comprised of a major proportion of propylene glycol together with small but critical amounts of borate, molybdate, nitrate, nitrite, tolyltriazole, and silicate, which is especially useful in areas where phosphates are prohibited.

DETAILED DESCRIPTION OF THE INVENTION

In general, the anhydrous antifreeze formulations of the invention contain 92 to 98 wt % of propylene glycol, although this amount may vary considerably.

As above indicated, the antifreeze formulation of the invention contains, in addition to propylene glycol, small but critical and effective amounts of borate, molybdate, nitrate, nitrite, tolyltriazole and silicate. Phosphate is excluded, and thus the formulation is particularly useful in marketing areas where the use of phosphate is prohibited.

The antifreeze formulation of the present invention contains by weight 0.16 to 0.81% borate calculated as $B_4O_7$, 0.073 to 0.36 molybdate calculated as $MoO_4$, 0.73 to 0.22 nitrate calculated as $NO_3$, 0.067 to 0.33% nitrite calculated as $NO_2$, 0.15 to 0.50% tolyltriazole (methylbenzotriazole) calculated as tolyltriazole, and 0.014 to 0.07% silicate calculated as $SiO_2$. It is desirable to include an effective amount of an antifoaming compound in the concentrate. Such components are well known and preferably may be a polyglycol-type or a silicone-type antifoaming agent.

These components are incorporated in the antifreeze formulation in soluble compound form, preferably in the form of an alkali metal salt, and most preferably as the sodium or potassium salt.

Sodium tetraborate is the preferred borate additive; the available hydrates such as sodium tetraborate pentahydrate ($Na_2B_4O_7 \cdot 5H_2O$) and sodium tetraborate decahydrate ($Na_2B_4O_7 \cdot 10H_2O$) are conveniently employed, the latter being preferred. Borate, expressed as sodium tetraborate decahydrate, in amount of 0.40 to 2.0 wt. % of the formulation is employed in accordance with the invention.

Sodium molybdate ($Na_2MoO_4$) is the preferred molybdate additive. The commercially available dihydrate ($Na_2MoO_4 \cdot 2H_2O$) is conveniently employed. Molybdate expressed as sodium molybdate dihydrate in amount of 0.2 to 1.0 wt. % of the antifreeze formulation is employed in accordance with the invention.

Nitrate is preferably added in the form of sodium nitrate (NaNO$_3$). In accordance with the invention, nitrate, expressed as sodium nitrate, in amount of 0.10 to 0.50 wt. % is employed in the antifreeze formulation.

Nitrite is preferably added in the form of sodium nitrite (NaNO$_2$). In accordance with the invention, nitrite, expressed as sodium nitrite in amount of 0.10 to 0.50 wt. % is employed in the antifreeze formulation.

Silicate is suitably employed in the form of sodium meta-silicate (Na$_2$SiO$_3$). The available hydrates, most notably the pentahydrate (Na$_2$SiO$_3$·5H$_2$O) are conveniently used. Expressed as sodium metasilicate pentahydrate, amounts of 0.05 to 0.25 wt. % of the antifreeze formulation are employed in accordance with the invention.

Tolyltriazole (C$_7$H$_7$N$_3$) is employed in the antifreeze formulation in amounts of 0.15 to 0.50 wt. % of the antifreeze formulation in accordance with the invention.

Alkali metal hydroxide, preferably NaOH is employed in amount sufficient to provide an apparent final pH of 9–11 for the anhydrous antifreeze formulation.

Although the value obtained in the anhydrous medium is not a true pH according to the accepted definition, the apparent PH value measured may still be used as a rough gauge of the coolant's quality.

Summarizing, the anhydrous antifreeze formulations of the invention have the composition by weight shown in the following table:

TABLE 1

| COMPONENT | (WT %) CONCENTRATION RANGE |
|---|---|
| Propylene Glycol | 92 to 98 |
| Borate, calculated as B$_4$O$_7$ | 0.16 to 0.81 |
| Molybdate, calculated as MoO$_4$ | 0.13 to 0.66 |
| Nitrate, calculated as NO$_3$ | 0.073 to 0.36 |
| Nitrite, calculated as NO$_2$ | 0.067 to 0.33 |
| Tolyltriazole (methylbenzotriazole) (C$_7$H$_7$N$_3$) | 0.15 to 0.50 |
| Silicate, calculated as SiO$_2$ | 0.014 to 0.07 |

Alkali metal hydroxide is desirably added in addition to the above components as necessary to adjust the apparent pH to 9–11. The formulations may also contain stabilizers, anti-foaming agents and the like.

Propylene glycol is the glycol employed, and the various components are preferably alkali metal compounds, usually sodium compounds according to the following:

TABLE 2

| COMPONENT | (WT %) CONCENTRATION |
|---|---|
| Propylene Glycol | 92 to 98 |
| Sodium Tetraborate Decahydrate (Na$_2$B$_4$O$_7$·10H$_2$O) | 0.40 to 2.0 |
| Sodium Molybdate (VI) Dihydrate (Na$_2$MoO$_4$·2H$_2$O) | 0.20 to 1.0 |
| Sodium Nitrate (NaNO$_3$) | 0.10 to 0.50 |
| Sodium Nitrite (NaNo$_2$) | 0.10 to 0.50 |
| Tolyltriazole (methylbenzotriazole) (C$_7$H$_7$N$_3$) | 0.15 to 0.50 |
| Sodium Metasilicate Pentahydrate (Na$_2$SiO$_3$·5H$_2$O) | 0.05 to 0.25 |

EXAMPLE I

An anhydrous antifreeze was prepared having the following composition given in Table 3.

TABLE 3

| COMPONENT | (WT %) CONCENTRATION |
|---|---|
| Propylene Glycol | 95.365 |
| Sodium Tetraborate Decahydrate (Na$_2$B$_4$O$_7$·10H$_2$O) | 0.90 |
| Sodium Molybdate (VI) Dihydrate (Na$_2$MoO$_4$·2H$_2$O) | 0.48 |
| Sodium Nitrate (NaNO$_3$) | 0.30 |
| Sodium Nitrite (NaNo$_2$) | 0.30 |
| Tolyltriazole (methylbenzotriazole) (C$_7$H$_7$N$_3$) | 0.32 |
| Sodium Metasilicate Pentahydrate (Na$_2$SiO$_3$·5H$_2$O) | 0.10 |
| Sodium Hydroxide (NaOH) | 0.275 |
| Q 1-6083* (silicate stabilizer) | 0.05 |
| Pluronic L-61** (anti-form) | 0.01 |

*Polysiloxane manufactured by DOW Corning.
**Polyoxypropylene - polyoxyethylene block copolymer manufactured by BASF.

The formulation was prepared by combining the appropriate relative amounts of the various components and mixing the combined materials overnight.

The formulation was subjected to certain standard ASTM tests to determine its suitability. The following are the results attained:

ASTM TEST RESULTS

D-1384 Corrosion Test for Engine Coolants in Glassware

| Coupon | Avg. Weight Loss, mg | Max Allowed* |
|---|---|---|
| copper | 6 | 10 |
| solder | 1 | 30 |
| brass | 5 | 10 |
| steel | 2 | 10 |
| cast iron | 3 | 10 |
| aluminum | 0 | 30 |

D-4340 Corrosion of Cast Aluminum Alloys in Engine Coolants Under Heat-Rejecting Conditions

| Average Weight Loss, mg/cm2/week | Max Allowed* |
|---|---|
| 0.35 | 1.0 |

D-2570 Simulated Service Corrosion Testing of Engine Coolants

| Coupon | Avg. Weight Loss. mg | Max Allowed* |
|---|---|---|
| copper | 18 | 20 |
| solder | 5 | 60 |
| brass | 3 | 20 |
| steel | 2 | 20 |

-continued

| Coupon | Avg. Weight Loss. mg | Max Allowed* |
|---|---|---|
| cast iron | 2 | 20 |
| aluminum | 1 | |

*-Maximum corrosion weight loss as specified in ASTM D-3306-89 specification for EG base engine coolants.

D-2809 Pump Cavitation*

"9" rating

*—Cavitation Erosion—Corrosion Characteristics of Aluminum Pumps with Engine Coolants.

From these results it can be seen that the antifreeze composition of the invention passed these ASTM test requirements by a wide margin.

In accordance with the present invention, there is provided a phosphate-free anti-corrosive antifreeze formulation which can be used successfully in those areas where phosphates are prohibited. In addition, the formulation of the present invention is used in the anhydrous form without water dilution, thus enabling successful use in engines which are adapted to operate at higher coolant temperatures for a more effective performance. In this respect it should be noted that comparable formulations based on ethylene glycol cannot be used in the anhydrous applications due to the unfavorable freezing point characteristics of such formulations.

What is claimed is:

1. A phosphate-free, substantially anhydrous anti-corrosive antifreeze formulation suitable for use as coolant in an engine cooling system without water dilution consisting of:

| COMPONENT | CONCENTRATION RANGE (WT %) |
|---|---|
| Propylene Glycol | 92–98 |
| Borate, calculated as $B_4O_7$ | 0.16–0.81 |
| Molybdate, calculated as $MoO_4$ | 0.13–0.66 |
| Nitrate, calculated as $NO_3$ | 0.073–0.36 |
| Nitrite, calculated as $NO_2$ | 0.067–0.33 |
| Tolyltriazole ($C_7H_7N_3$) | 0.15–0.50 |
| Silicate, calculated as $SiO_2$ | 0.014–0.07 |

* * * * *